US 10,421,150 B2

(12) United States Patent
Odakura et al.

(10) Patent No.: US 10,421,150 B2
(45) Date of Patent: Sep. 24, 2019

(54) FRICTION STIR WELDING DEVICE

(71) Applicant: Hitachi Power Solutions Co., Ltd., Hitachi-shi, Ibaraki (JP)

(72) Inventors: Tomio Odakura, Tokyo (JP); Koichi Ishiguro, Tokyo (JP)

(73) Assignee: Hitachi Power Solutinos Co., Ltd., Hitachi-shi (JP)

( * ) Notice: Subject to any disclaimer, the term of this patent is extended or adjusted under 35 U.S.C. 154(b) by 0 days.

(21) Appl. No.: 16/097,003

(22) PCT Filed: Apr. 25, 2017

(86) PCT No.: PCT/JP2017/016424
§ 371 (c)(1),
(2) Date: Oct. 26, 2018

(87) PCT Pub. No.: WO2017/188272
PCT Pub. Date: Nov. 2, 2017

(65) Prior Publication Data
US 2019/0126385 A1    May 2, 2019

(30) Foreign Application Priority Data

Apr. 28, 2016 (JP) .................................. 2016-090487

(51) Int. Cl.
B23K 20/12 (2006.01)
B23Q 11/10 (2006.01)
(Continued)

(52) U.S. Cl.
CPC .......... B23K 20/1235 (2013.01); B23K 20/12 (2013.01); B23K 20/1245 (2013.01);
(Continued)

(58) Field of Classification Search
CPC .... B23K 20/1255; B23K 20/12; B23K 20/26; B23K 37/003; B23K 20/122
See application file for complete search history.

(56) References Cited

U.S. PATENT DOCUMENTS 4,103,138 A * 7/1978 Moriki ..................... B23K 9/04
219/76.11
6,516,992 B1   2/2003 Colligan
(Continued)

FOREIGN PATENT DOCUMENTS

JP    11-10367 A    1/1999
JP    2-139049 U    11/1999
(Continued)

OTHER PUBLICATIONS

International Search Report (PCT/ISA/210) issued in PCT Application No. PCT/JP2017/016424 dated Jun. 6, 2017 with English translation (four pages).
(Continued)

Primary Examiner — Erin B Saad
(74) Attorney, Agent, or Firm — Crowell & Moring LLP

(57) ABSTRACT

The invention is directed to a friction stir welding device which can realize appropriate friction stir welding while preventing a welding tool from being worn out and damaged. Therefore, the friction stir welding device is provided with a welding tool which rotates while abutting on a member to be welded to cause a plastic flow phenomenon in the member to be welded, a tool holder which grasps the welding tool and rotates together with the welding tool, supply paths which are formed in the tool holder and supply a refrigerant to the welding tool.

4 Claims, 5 Drawing Sheets

(51) Int. Cl.
*B23Q 11/14* (2006.01)
*F25D 17/02* (2006.01)
*B23K 37/00* (2006.01)
*B23K 20/26* (2006.01)

(52) U.S. Cl.
CPC ............ *B23K 37/003* (2013.01); *B23Q 11/10* (2013.01); *B23Q 11/14* (2013.01); *F25D 17/02* (2013.01); *B23K 20/26* (2013.01)

(56) References Cited

U.S. PATENT DOCUMENTS

| | | | | | |
|---|---|---|---|---|---|
| 6,776,328 | B2* | 8/2004 | Rice | ............... | B23K 20/1235 228/112.1 |
| 7,032,801 | B2* | 4/2006 | Raether | ............ | B23K 20/1235 228/2.1 |
| 7,121,448 | B2* | 10/2006 | Subramanian | ....... | B23K 20/122 228/2.1 |
| 7,334,971 | B2* | 2/2008 | Benedetti | .......... | B23Q 11/0046 408/67 |
| 7,845,544 | B2* | 12/2010 | Machida | ............ | B23K 20/1245 228/112.1 |
| 8,998,066 | B2* | 4/2015 | Matsunaga | ........ | B23K 20/1255 228/112.1 |
| 2003/0116608 | A1 | 6/2003 | Litwinski | | |
| 2005/0006438 | A1 | 1/2005 | Andersson et al. | | |
| 2007/0114263 | A1 | 5/2007 | Machida et al. | | |
| 2012/0298304 | A1* | 11/2012 | Kato | ................. | B23K 20/1235 156/350 |
| 2018/0221986 | A1 | 8/2018 | Odakura et al. | | |

FOREIGN PATENT DOCUMENTS

| | | | |
|---|---|---|---|
| JP | 2000-287410 | A | 10/2000 |
| JP | 2003-236681 | A | 8/2003 |
| JP | 3530342 | B2 | 5/2004 |
| JP | 2005-506205 | A | 3/2005 |
| JP | 2007-130646 | A | 5/2007 |
| JP | 2012-101690 | A | 5/2012 |
| JP | 5883978 | B1 | 3/2016 |

OTHER PUBLICATIONS

Japanese-language Written Opinion (PCT/ISA/237) issued in PCT Application No. PCT/JP2017/016424 dated Jun. 6, 2017 (five pages).

* cited by examiner

[FIG. 1]
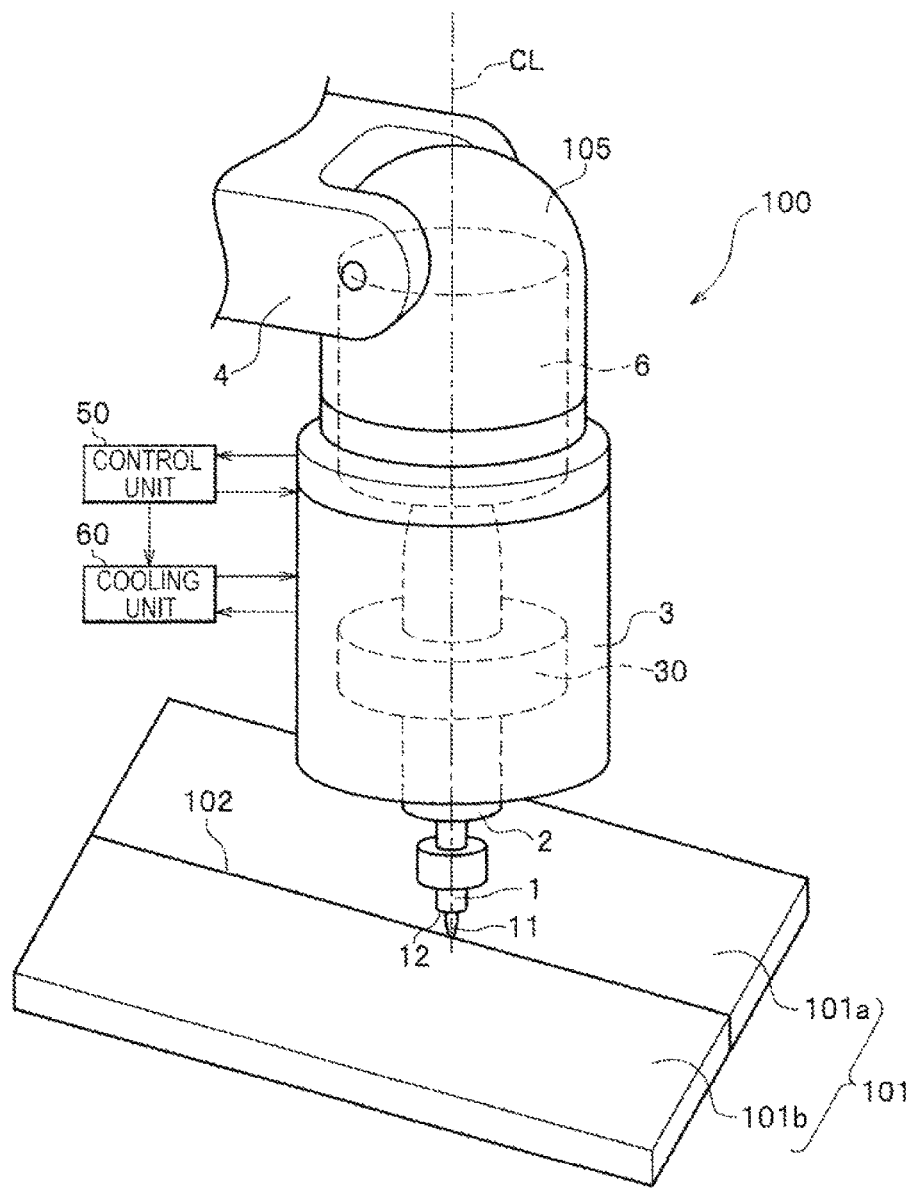

[FIG. 2]
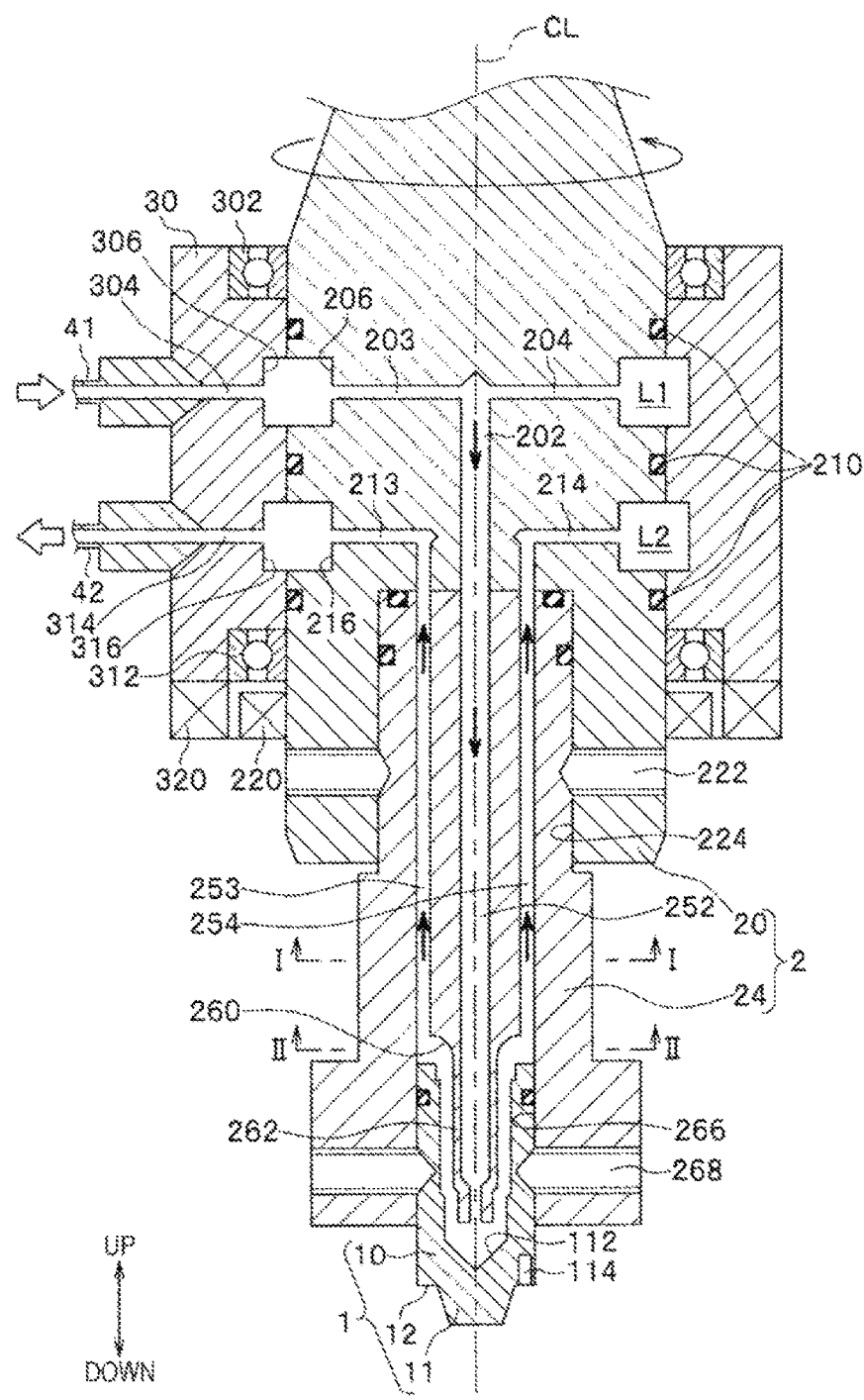

[FIG. 3]
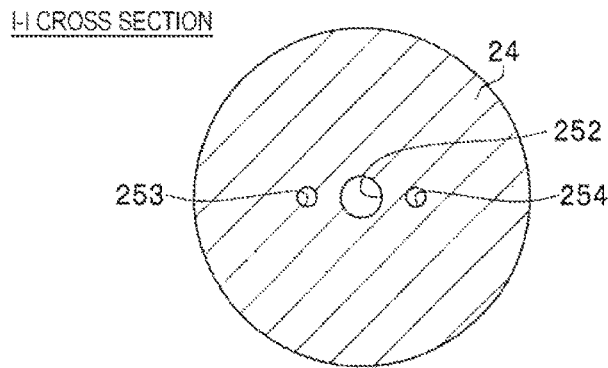
[FIG. 4]
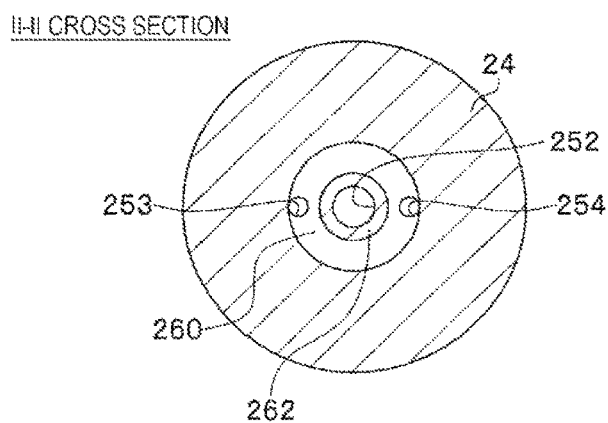
[FIG. 5]
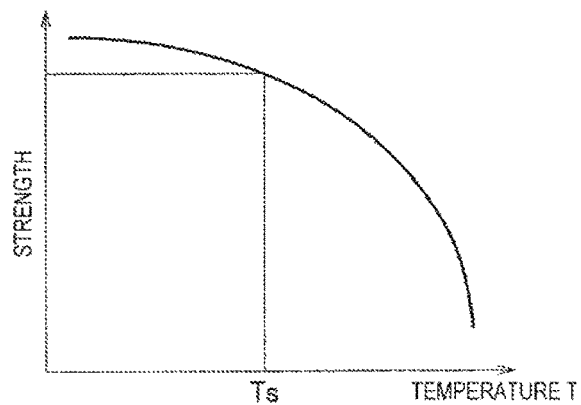

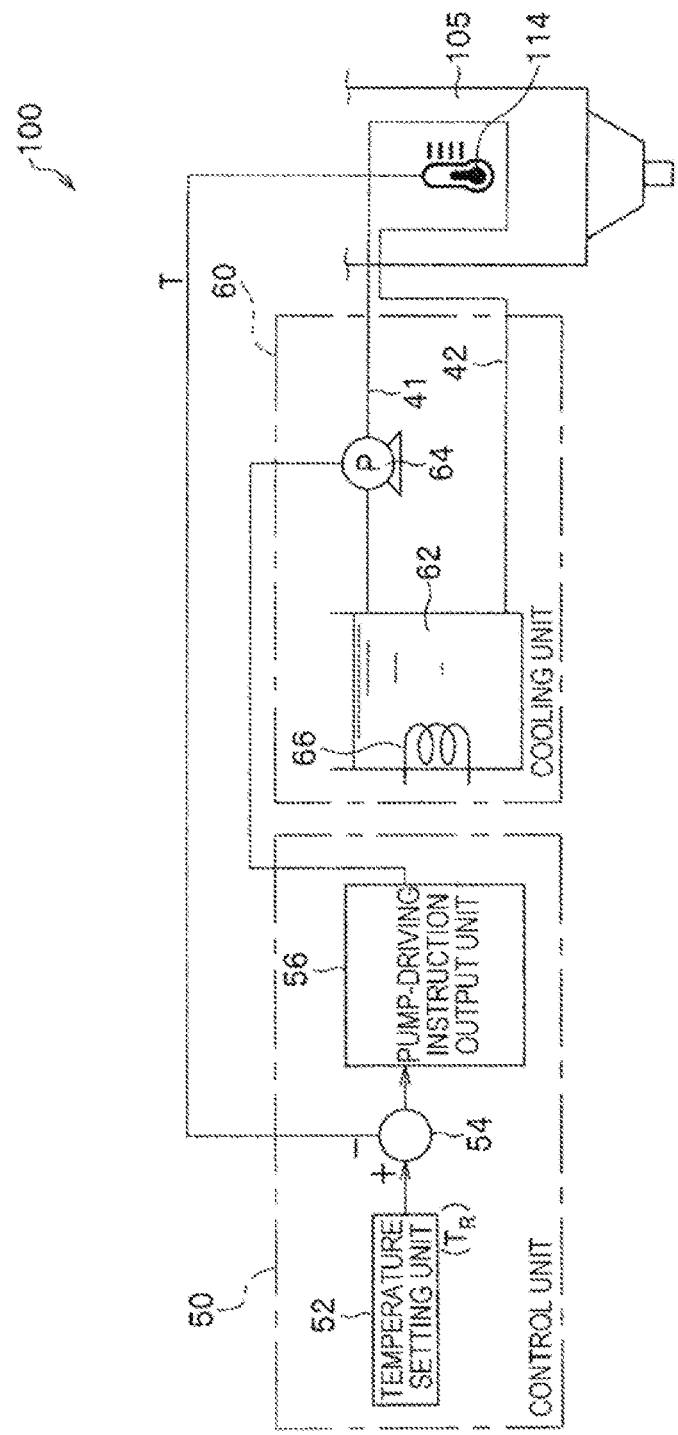
[FIG. 6]

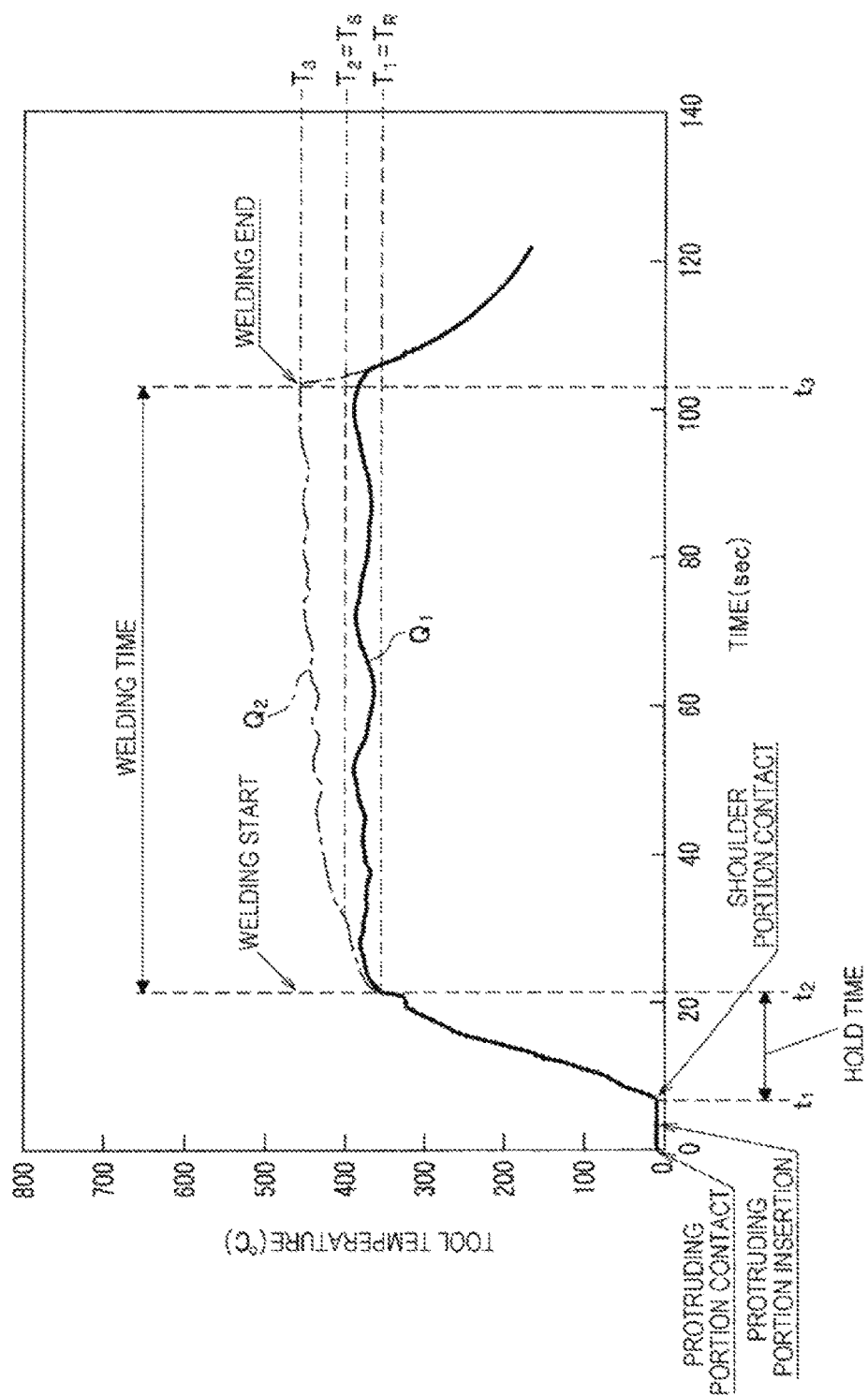
[FIG. 7]

FRICTION STIR WELDING DEVICE

TECHNICAL FIELD

The present invention relates to a friction stir welding device.

BACKGROUND ART

A friction stir welding device (hereinafter, referred to as FSW (Friction Stir Welding) apparatus) is an apparatus which applies friction heat to a member to be welded by a rotating welding tool, causes a plastic flow phenomenon in the member to be welded, stirs the member to be welded by the welding tool, and welds the member to be welded. Herein, when the welding tool is continuously used to be in an overheated state, the welding tool is easily worn out or damaged. Regarding this problem, PTL 1 discloses in claim 1 that " . . . includes a control device which controls at least one of a rotating speed of the welding tool driven by the tool rotating drive device and a moving speed of the welding tool driven by the tool moving drive device such that the tool temperature falls within a predetermined range of management temperature."

CITATION LIST

Patent Literature

PTL 1: Japanese Patent No. 5883978

SUMMARY OF INVENTION

Technical Problem

In the technique disclosed in PTL 1, when the rotating speed or the moving speed of the welding tool is controlled, the temperature of the welding tool can be certainly lowered to some degrees. However, if the friction heat to be applied to the member to be welded is not sufficient due to the control, there easily occur various defects at the welding place. On the other hand, if the rotating speed or the moving speed is kept not to cause the defect at the welding place, the welding tool enters an overheated state as described above, and the welding tool is easily worn out or damaged.

The invention has been made in view of the above problem, and an object thereof is to provide a friction stir welding device which can realize appropriate friction stir welding while preventing the welding tool from being worn out and damaged.

Solution to Problem

A friction stir welding device of the invention for solving the problem includes a welding tool which rotates while abutting on a member to be welded to cause a plastic flow phenomenon in the member to be welded, a tool holder which grasps the welding tool and rotates together with the welding tool, supply paths which are formed in the tool holder and supply a refrigerant to the welding tool, collecting paths which are formed in the tool holder and collect the refrigerant from the welding tool, a cooling unit which cools downs the refrigerant collected from the collecting paths and returns the refrigerant to the supply paths, and a support portion which supports the tool holder to be freely rotated. A first annular flow path and a second annular flow path are formed between the tool holder and the support portion facing each other. The first and second annular flow paths include respectively a support-portion-side concave portion which is a ring-shaped groove formed to go around an inner peripheral surface of the support portion along a circumference direction, and a tool-holder-side concave portion which is a ring-shaped groove formed in the tool holder to face the support-portion-side concave portion. The supply paths communicate with the first annular flow path through which an outgoing refrigerant flows. The collecting paths communicate with the second annular flow path through which an incoming refrigerant flows. The cooling unit supplies the refrigerant to the first annular flow path, and collects the refrigerant from the second annular flow path.

Advantageous Effects of Invention

According to the invention, it is possible to realize appropriate friction stir welding while preventing a welding tool from being worn out and damaged.

BRIEF DESCRIPTION OF DRAWINGS

FIG. 1 is a perspective view of an FSW apparatus according to an embodiment of the invention.

FIG. 2 is a cross-sectional view of main parts of the FSW apparatus.

FIG. 3 is a cross-sectional view taken along line I-I of FIG. 2.

FIG. 4 is a cross-sectional view taken along line II-II of FIG. 2.

FIG. 5 is a diagram illustrating a strength characteristic of a welding tool.

FIG. 6 is a block diagram of a control system of the FSW apparatus.

FIG. 7 is a diagram illustrating a transition example of the temperature of the welding tool.

DESCRIPTION OF EMBODIMENTS

[Overall Configuration of Embodiment]

Hereinbelow, embodiments of the invention will be described in detail with reference to the drawings. Further, in the drawings, the common components are attached with the same symbol, and the redundant descriptions will be omitted.

FIG. 1 is a perspective view of an FSW apparatus 100 (friction stir welding device) according to an embodiment of the invention. As illustrated in FIG. 1, the FSW apparatus 100 includes an apparatus body part 105, a control unit 50, and a cooling unit 60. In addition, the apparatus body part 105 includes a welding tool 1 provided with a protruding portion 11, a tool holder 2 holding the welding tool 1, and a housing 3 which rotatably holds the tool holder 2. Herein, the housing 3 is a columnar container, and stores a main shaft motor 6 and the like which rotate the approximate cylindrical tool holder 2 about a main axis CL. In addition, the main axis CL indicates a center axis of the approximate cylindrical tool holder 2.

The housing 3 which holds the welding tool 1 and the tool holder 2 as described above is provided in a machining tool (not illustrated) or a tip portion of an arm 4 of a multi-shaft robot. In other words, the welding tool 1 is driven by the machining tool or the arm 4 of the multi-shaft robot to freely move even in an upward and downward direction and a plane direction.

The protruding portion 11 of the welding tool 1 has a pin shape with the main axis CL as the center, and is frequently called a welding tool pin portion. Here, it is assumed a case where members to be welded 101a and 101b of various types of metal are welded. In this case, the welding tool 1 held in the tool holder 2 presses the protruding portion 11 to be fitted into a welding line 102 which is a boundary between the members to be welded 101a and 101b while rotating. At this time, the protruding portion 11 is pressed up to a position where a portion (referred to as a tool shoulder portion 12) except the protruding portion 11 of a bottom surface of the main body of the welding tool 1 comes to contact with the surfaces of the members to be welded 101a and 101b.

When the protruding portion 11 is pressed fit into, a plastic flow phenomenon occurs in the members to be welded 101a and 101b due to friction heat generated when the protruding portion 11 and the tool shoulder portion 12 are rotated while being in contact with the members to be welded 101a and 101b. Then, the materials forming the members to be welded 101a and 101b showing the plastic flow phenomenon are stirred by the welding tool 1 to be mixed together. Further, the control unit 50 controls the welding tool 1 to move along the welding line 102 in a state where the protruding portion 11 is pressed fit into the members to be welded 101a and 101b. As a result, the boundary portion between the members to be welded 101a and 101b is welded.

The cooling unit 60 cools down the welding tool 1. In other words, the cooling unit 60 supplies the cooled refrigerant to the welding tool 1 through the housing 3 and the tool holder 2, and collects the refrigerant heated at the welding tool 1 through the tool holder 2 and the housing 3. Further, the refrigerant may be a liquid such as "water", or may be gas. In the housing 3, a support portion 30 is provided which supports the tool holder 2 to be freely rotated and through which the refrigerant is circulated. In addition, the control unit 50 controls a rotating speed, a moving speed, a moving direction and so on of the welding tool 1, and instructs a flow rate of the refrigerant with respect to the cooling unit 60.

[Details Around Tool Holder]

Next, FIG. 2 is a cross-sectional view illustrating main parts of the apparatus body part 105. In other words, when the welding tool 1, the tool holder 2, and the support portion 30 are cut along the main axis CL in FIG. 1, FIG. 2 is obtained. The tool holder 2 can face various directions. Herein, the upper side of the paper in FIG. 2 is called "UP", and the lower side of the paper is called "DOWN".

In FIG. 2, the support portion 30 is formed in a substantially columnar shape, and bearings 302 and 312 are mounted in the inner surface on both upward and downward ends. With this configuration, the support portion 30 supports the tool holder 2 to be freely rotated.

The tool holder 2 includes a supported portion 20 and the holding portion 24. The upper end of the supported portion 20 is engaged with the main shaft motor 6 (see FIG. 1), and in the lower surface thereof is formed with a concave portion 224 which is dented in a substantially cylindrical shape. The upper portion of the holding portion 24 is inserted into the concave portion 224. In addition, in the lower portion of the supported portion 20, a screw hole 222 is formed in a radiation direction. The supported portion 20 and the holding portion 24 are fixed to each other by screwing a bolt (not illustrated) in the screw hole 222.

In addition, in the lower surface of the holding portion 24, a concave portion 266 is formed which is dented in a substantially cylindrical shape. The upper end of the welding tool 1 is inserted into the concave portion 266. In addition, in the lower portion of the holding portion 24, a screw hole 268 is formed in the radiation direction. The holding portion 24 and the welding tool 1 are fixed to each other by screwing a bolt (not illustrated) in the screw hole 268. The outer periphery of the support portion 30 is connected with an outgoing pipe 41 through which the refrigerant is supplied to the support portion 30, and an incoming pipe 42 which collects the refrigerant from the support portion 30. An outgoing flow path 304 and an incoming flow path 314 are formed in the support portion 30 to pass through an outer peripheral surface and an inner peripheral surface of the support portion 30.

In the inner peripheral surface of the support portion 30, there are formed concave portions 306 and 316 having a substantially U shape of the cross section to communicate with the flow paths 304 and 314. Since the concave portions 306 and 316 are formed to go around the inner periphery along a circumference direction, the concave portions 306 and 316 become a ring-shaped groove. In the supported portion 20, concave portions 206 an 216 having a substantially U shape of the cross section are formed in places facing the concave portions 306 and 316. With this configuration, an annular flow path L1 (first annular flow path) is formed between the concave portions 206 and 306 to circulate an outgoing refrigerant. An annular flow path L2 (second annular flow path) is formed between the concave portions 216 and 316 to circulate an incoming refrigerant. On the upper and lower sides of the annular flow path L1 and on the lower side of the annular flow path L2, a ring-shaped packing 210 is fitted between the supported portion 20 and the support portion 30. With this configuration, watertightness of the annular flow paths L1 and L2 is secured. In the supported portion 20, a supply path 202 is formed which is a channel with the main axis CL as the center.

The supply path 202 and the annular flow path L1 communicate with each other through supply paths 203 and 204 which are formed along a radius direction and serve as two channels. In addition, two collecting paths 213 and 214 which have an L-shaped route are connected to the annular flow path L2. In the holding portion 24, a supply path 252 and collecting paths 253 and 254 are formed to communicate with the supply path 202 and the collecting paths 213 and 214 of the supported portion 20 respectively. In the upper portion of the welding tool 1, an annular collecting path 260 is formed. The collecting paths 253 and 254 communicate with the collecting path 260.

Next, FIG. 3 is a cross-sectional view taken along line I-I in FIG. 2, and FIG. 4 is a cross-sectional view taken along line II-II in FIG. 2.

As illustrated in FIG. 3, in the I-I cross section, the supply path 252 and the collecting paths 253 and 254 are flow paths of which the cross sections are circular. In addition, as illustrated in FIG. 4, in the II-II cross section, the collecting paths 253 and 254 communicate with the collecting path 260, and the periphery of the supply path 252 serves as a columnar projecting portion 262.

Returning to FIG. 2, the welding tool 1 includes a main portion 10 which is formed in a columnar shape, and the protruding portion 11 which is formed in the lower end of the main portion 10. In addition, a temperature sensor 114 is embedded in the welding tool 1. Further, in the example of the drawing, the temperature sensor 114 is embedded on the upper side from the tool shoulder portion 12. However, the temperature sensor 114 may be embedded on the lower side from the tool shoulder portion 12, that is, inside the protruding portion 11.

In addition, the columnar projecting portion 262 jets the refrigerant toward the upper end of the main portion 10. The cooling medium is supplied from the supply path 203 (204) and contributes to the cooling of the main portion 10. After that, the cooling medium is collected through the collecting path 213 (214). A concave portion 112 is formed in the upper end of the main portion 10, and the refrigerant is jetted toward the concave portion 112, whereby a cooling effect on the protruding portion 11 is improved and the cooling medium may be remained therein. In that case, the columnar projecting portion 262 may be loosely inserted to the concave portion 112. Further, the depth of the concave portion 112 is set to a predetermined depth based on a target cooling effect. The depth is preferably set to 5 mm or more in order to achieve a meaningful cooling effect, and more preferably 10 mm or more.

An annular-shaped fixed communication portion 320 is mounted in the lower surface of the support portion 30. In addition, a rotating communication portion 220 having an annular shape is mounted in the supported portion 20 to be concentric with the fixed communication portion 320. When the tool holder 2 is rotated, the rotating communication portion 220 and the fixed communication portion 320 are relatively rotated. However, in such a rotating state, power is supplied from the fixed communication portion 320 to the rotating communication portion 220, and the fixed communication portion 320 and the rotating communication portion 220 communicate bidirectionally. In particular, a tool temperature T is transmitted as a measurement result of the temperature sensor 114 from the rotating communication portion 220 to the fixed communication portion 320. Then, the tool temperature T is transmitted from the fixed communication portion 320 to the control unit 50 (see FIG. 1).

[Strength Characteristic of Welding Tool]

FIG. 5 is a diagram illustrating a strength characteristic of the welding tool 1. As illustrated in FIG. 5, the strength of the welding tool 1 is weakened as the temperature of the welding tool 1 (the tool temperature T) increases. Here, a temperature at which the strength steeply falls down with respect to the temperature rise is called a "target upper-limit temperature $T_S$". The target upper-limit temperature $T_S$ is not strictly defined. The strength characteristic and the target upper-limit temperature $T_S$ of the welding tool 1 are determined according to a material of the welding tool 1. However, a curve shape of the strength characteristic is common regardless of the material of the welding tool 1, and becomes the shape as illustrated in FIG. 5.

For example, in a case where the material of the welding tool 1 is SDK-61 steel (JIS G 4404), the target upper-limit temperature $T_S$ is near 400° C. When being excessively used over the target upper-limit temperature $T_S$, the welding tool 1 is steeply worn out or damaged. Therefore, it is desirably to be used at the target upper-limit temperature $T_S$ or lower. However, according to the related art, in a case where the welding tool 1 is continuously used, the temperature of the welding tool is hardly kept at the target upper-limit temperature $T_S$ or lower unless the welding tool 1 is actively cooled down, resulting in reduction of the life cycle of the welding tool 1.

[Control System]

FIG. 6 is a block diagram of a control system of the FSW apparatus 100 according to the embodiment.

In FIG. 6, the cooling unit 60 includes a refrigerant tank 62, a pump 64, and a cooler 66. The refrigerant tank 62 stores the refrigerant, and the cooler 66 cools down the refrigerant inside the refrigerant tank 62 and holds the temperature within a predetermined range. The pump 64 supplies the refrigerant to the apparatus body part 105 through the outgoing pipe 41, and circulates the refrigerant.

In addition, the refrigerant heated in the apparatus body part 105 is collected to the refrigerant tank 62 through the incoming pipe 42. In the example illustrated in the drawing, the pump 64 is provided in the outgoing pipe 41. However, the pump 64 may be provided in the incoming pipe 42, or may be provided in both pipes 41 and 42.

In addition, the control unit 50 includes a temperature setting unit 52, a subtraction unit 54, and a pump-driving instruction output unit 56. The temperature setting unit 52 sets a target temperature $T_R$ of the welding tool 1. The subtraction unit 54 outputs deviation $(T_R-T)$ between the target temperature $T_R$ and the tool temperature T. The pump-driving instruction output unit 56 controls a discharge speed of the pump 64 based on the deviation $(T_R-T)$. In other words, when the tool temperature T is lower than the target temperature $T_R$, the pump-driving instruction output unit 56 stops the pump 64, and operates the pump 64 when the tool temperature T is equal to or higher than the target temperature $T_R$. Then, when the pump 64 is operated, the pump 64 is feedback-controlled such that the discharge speed of the pump 64 is increased as an absolute value of the deviation $(T_R-T)$ is increased (that is, as the tool temperature T increases).

[Transition Example of Temperature]

FIG. 7 is a diagram illustrating a transition example of the tool temperature T of the welding tool 1 in the embodiment.

In FIG. 7, $t_1$ is set to a time when the protruding portion 11 (see FIG. 1) comes into contact with the surfaces of the members to be welded 101a and 101b, is pressed fit thereinto, and the tool shoulder portion 12 comes into contact with the same surface. Until time $t_1$, the tool temperature T measured by the temperature sensor 114 (see FIG. 2) rarely increases. After time $t_1$, the tool shoulder portion 12 keeps in contact with the surfaces of the members to be welded 101a and 101b while rotating. Therefore, friction heat is continuously generated, and the tool temperature T increases.

Thereafter, the tool temperature T reaches a predetermined temperature $T_1$ at time $t_2$. Accordingly, the control unit 50 determines that the plastic flow phenomenon occurs in the members to be welded 101a and 101b. This state is called a "welding start state". In the example of FIG. 7, the temperature $T_1$ is set to be equal to the target temperature $T_R$ illustrated in FIG. 6, but the both temperatures may be set differently. In addition, a time from time $t_1$ to time $t_2$ is a time for waiting for occurrence of the plastic flow phenomenon, and is called a "hold time".

In the welding start state, the control unit 50 starts the transition of the welding tool 1 along the welding line 102 in a state where the protruding portion 11 of the welding tool 1 is pressed to be fitted between the members to be welded 101a and 101b. Thereafter, the control unit 50 keeps the transition of the welding tool 1 until time $t_3$ when the welding tool 1 reaches a predetermined welding end point. A time from time $t_2$ to time $t_3$ is called a "welding time". When the welding time ends at time $t_3$, the protruding portion 11 of the welding tool 1 is pulled out of the members to be welded 101a and 101b, and the temperature of the welding tool 1 steeply decreases.

In the welding time of times $t_2$ to $t_3$, the tool temperature T varies in a range of the temperatures $T_1$ to $T_2$ as illustrated as Characteristic $Q_1$. This is because the discharge speed of the refrigerant by the pump 64 is feedback-controlled by the control unit 50 to suppress the variation of the tool temperature T. Here, Temperature $T_2$ illustrated in FIG. 7 is a value equal to the target upper-limit temperature $T_S$ illustrated in FIG. 5. That is, according to the embodiment, the tool temperature T can be suppressed to be equal to or lower than the target upper-limit temperature $T_S$ over the entire welding time, and the wearing and the damage of the welding tool 1 can be prevented.

In addition, the characteristic of the tool temperature T in a case where the cooling unit 60 is not operated at all is illustrated as Characteristic $Q_2$ in the drawing. In Characteristic $Q_z$, the tool temperature T reaches Temperature $T_3$ higher than Temperature $T_2$ (=the target upper-limit temperature $T_S$), and the welding tool 1 becomes easily worn out and damaged.

As described above, according to the embodiment, the FSW apparatus 100 includes the welding tool 1 which rotates while abutting on the members to be welded 101a and 101b to cause a plastic flow phenomenon in the members to be welded 101a and 101b, the tool holder 2 which grasps the welding tool 1 and is rotated together with the welding tool 1, and the supply paths 202, 203, 204, and 252 which are formed in the tool holder 2 to supply the refrigerant to the welding tool 1. Therefore, the FSW apparatus 100 can apply sufficient friction heat to the members to be welded 101a and 101b to cool down the welding tool 1, thereby realizing appropriate friction stir welding while preventing the welding tool 1 from being worn out and damaged.

[Modifications]

The invention is not limited to the above embodiments, and various modifications can be made. The embodiments are given as examples for describing the invention in a clearly understandable way, and are not limited to necessarily include all the configurations described above. In addition, some configurations of a certain embodiment may be replaced with the configurations of another embodiment, and the configuration of the other embodiment may also be added to the configuration of a certain embodiment. Furthermore, omission of some configurations of each embodiment, or additions and substitutions may be made using other configurations. A possible modification of the above embodiment is as follows.

(1) In the above-described embodiment, the cooling unit 60 is disposed on the outside of the tool holder 2. However, the cooling unit 60 may be disposed inside the tool holder 2. With this configuration, since the flow path of the refrigerant is completed inside the tool holder 2, the watertightness can be improved with an inexpensive configuration.

(2) In the embodiment, the refrigerant is circulated and reused. However, the refrigerant may not be circulated but may be used and discarded. For example, "water" may be employed as the refrigerant to cool down the welding tool 1 in an evaporative manner, and the resultantly generated steam may be discharged to the outside of the apparatus body part 105.

REFERENCE SIGNS LIST

1: welding tool
2: tool holder
10: main portion
11: protruding portion
30: support portion
50: control unit
60: cooling unit
62: refrigerant tank
64: pump
66: cooler
100: FSW apparatus (friction stir welding device)
101a, 101b: member to be welded
105: apparatus body part
112: concave portion
114: temperature sensor
202, 203, 204, 252: supply path
213, 214, 253, 254: collecting path
L1: annular flow path (first annular flow path)
L2: annular flow path (second annular flow path)

The invention claimed is:

1. A friction stir welding device comprising:
a welding tool which rotates while abutting on a member to be welded to cause a plastic flow phenomenon in the member to be welded;
a tool holder which grasps the welding tool and rotates together with the welding tool;
supply paths which are formed in the tool holder and supply a refrigerant to the welding tool;
collecting paths which are formed in the tool holder and collect the refrigerant from the welding tool;
a cooling unit which cools downs the refrigerant collected from the collecting paths and returns the refrigerant to the supply paths;
a support portion which supports the tool holder to be freely rotated;
a temperature sensor which is embedded in the welding tool; and
a control unit, wherein
a first annular flow path and a second annular flow path are formed between the tool holder and the support portion facing each other,
the first and second annular flow paths include respectively a support-portion-side concave portion which is a ring-shaped groove formed to go around an inner peripheral surface of the support portion along a circumference direction, and a tool-holder-side concave portion which is a ring-shaped groove formed in the tool holder to face the support-portion-side concave portion,
the supply paths communicate with the first annular flow path through which an outgoing refrigerant flows,
the collecting paths communicate with the second annular flow path through which an incoming refrigerant flows,
the cooling unit includes a refrigerant tank which stores the refrigerant, a pump which circulates the refrigerant, and a cooler which cools down the refrigerant inside the refrigerant tank, supplies the refrigerant to the first annular flow path, and collects the refrigerant from the second annular flow path, and
the control unit controls a discharge speed by the pump based on a deviation between a tool temperature detected by the temperature sensor and a target temperature.

2. The friction stir welding device according to claim 1, wherein
the control unit drives the pump under a condition that the tool temperature is equal to or higher than a predetermined target temperature.

3. The friction stir welding device according to claim 2, wherein
the control unit controls the pump such that the discharge speed of the refrigerant by the pump increases as the tool temperature increases.

4. The friction stir welding device according to claim 1, wherein
the welding tool includes
a main portion which is formed in a columnar shape,
a protruding portion which is formed in one end of the main portion, and a concave portion which is formed in the other end of the main portion and includes a tip portion having a substantially triangular cross-sectional shape.

\* \* \* \* \*